(12) United States Patent
Girard et al.

(10) Patent No.: US 9,150,140 B2
(45) Date of Patent: Oct. 6, 2015

(54) REMOTELY OPERABLE CAP ASSEMBLY FOR A TANKER TRAILER

(71) Applicant: GIRARD EQUIPMENT, INC., Vero Beach, FL (US)

(72) Inventors: Timothy P. Girard, Vero Beach, FL (US); Michael Fernandez, Vero Beach, FL (US); Glen Harm, Port St. Lucie, FL (US)

(73) Assignee: GIRARD EQUIPMENT, INC., Vero Beach, FL (US)

( * ) Notice: Subject to any disclaimer, the term of this patent is extended or adjusted under 35 U.S.C. 154(b) by 68 days.

(21) Appl. No.: 14/167,027

(22) Filed: Jan. 29, 2014

(65) Prior Publication Data
US 2014/0210197 A1    Jul. 31, 2014

Related U.S. Application Data

(60) Provisional application No. 61/757,765, filed on Jan. 29, 2013.

(51) Int. Cl.
*B60P 3/22* (2006.01)
*B65D 43/16* (2006.01)
*B65D 43/26* (2006.01)

(52) U.S. Cl.
CPC ............... *B60P 3/226* (2013.01); *B65D 43/16* (2013.01); *B65D 43/26* (2013.01)

(58) Field of Classification Search
CPC .. B65D 2590/664; B65D 43/16; B65D 43/18; B65D 43/26; B65D 90/10; B60P 3/226; B60P 3/224; B60P 3/22

USPC ......... 220/830, 827, 810, 823, 820, 813, 812, 220/816, 326, 324, 254.4, 254.5, 254.3, 220/254.1, 259.5, 259.1, 256.1, 203.22, 220/203.27, 203.23, 203.19, 203.01, 220/203.29, 264, 263, 262; 280/837, 838, 280/839, 830; 137/565.19

See application file for complete search history.

(56) References Cited

U.S. PATENT DOCUMENTS

| | | | | |
|---|---|---|---|---|
| 1,799,288 A | * | 4/1931 | Davis, Jr. | 137/267 |
| 2,004,715 A | | 11/1932 | Thwaits | |
| 2,923,430 A | * | 2/1960 | Stengele | 220/264 |
| 3,262,227 A | * | 7/1966 | Pentecost | 49/354 |
| 3,311,255 A | * | 3/1967 | Loveless | 220/324 |
| 3,981,325 A | | 9/1976 | Robinson et al. | |
| 4,009,862 A | | 3/1977 | DeFrees | |
| 4,109,677 A | * | 8/1978 | Burnside | 137/586 |
| 4,406,299 A | | 9/1983 | DeFrees | |
| 4,501,377 A | * | 2/1985 | Palmer, III | 220/203.09 |

(Continued)

*Primary Examiner* — Robert J Hicks
(74) *Attorney, Agent, or Firm* — Robert L. Wolter, Esq.; Beusse Wolter Sanks & Maire, PLLC

(57) ABSTRACT

A cap assembly (40) for attachment to an external fixture (44) on a tank (52) of a tanker trailer (50), including: a collar (42) configured to secure the cap assembly to the tank external fixture and defining a collar opening (46) concentrically aligned with an opening (54) of the fixture; a lid (60) that is moveable between a closed position where the lid covers the collar opening and is in sealing engagement with the collar, and an open position where the lid is vertically raised from the collar and pivoted laterally away from the collar opening; and an actuator assembly (72) that is configured to move the lid from the closed position to the open position during a single stroke of the actuator assembly, and which is remotely operable from a location off of the tanker trailer.

23 Claims, 10 Drawing Sheets

(56) References Cited

U.S. PATENT DOCUMENTS

| | | | |
|---|---|---|---|
| 4,505,288 A | 3/1985 | Murphy et al. | |
| 4,709,901 A | 12/1987 | Pierson et al. | |
| 4,854,076 A | 8/1989 | Sieben et al. | |
| 4,920,304 A | 4/1990 | Antonowitz | |
| 5,056,544 A | 10/1991 | Stevens | |
| 5,092,963 A * | 3/1992 | Barker et al. | 202/250 |
| 5,203,372 A | 4/1993 | Freiler | |
| 5,586,678 A * | 12/1996 | Rosch et al. | 220/263 |
| 5,647,334 A | 7/1997 | Miller | |
| 5,918,756 A * | 7/1999 | Morgan | 220/263 |
| 6,053,348 A * | 4/2000 | Morch | 220/263 |
| 6,095,365 A * | 8/2000 | Yielding | 220/264 |
| 6,145,530 A | 11/2000 | Fernandez | |
| 6,173,854 B1 | 1/2001 | Labelle et al. | |
| 6,293,051 B1 | 9/2001 | Matye | |
| 6,318,402 B1 | 11/2001 | Ladeira | |
| 6,352,036 B1 | 3/2002 | Early | |
| 6,561,373 B1 | 5/2003 | Chapin | |
| 6,691,683 B2 | 2/2004 | Gracyalny et al. | |
| 6,837,266 B2 | 1/2005 | Fredrickson et al. | |
| 7,055,440 B2 | 6/2006 | Sisk | |
| 7,658,570 B2 | 2/2010 | Hill et al. | |
| 8,070,009 B2 | 12/2011 | McKenzie et al. | |
| 8,083,087 B2 * | 12/2011 | Asterlin et al. | 220/263 |
| 2002/0190068 A1* | 12/2002 | Sisk et al. | 220/263 |
| 2005/0166458 A1* | 8/2005 | McKenzie et al. | 49/394 |
| 2008/0078127 A1* | 4/2008 | Hill et al. | 52/19 |
| 2009/0145905 A1* | 6/2009 | Kim | 220/345.1 |

* cited by examiner

REMOTELY OPERABLE CAP ASSEMBLY FOR A TANKER TRAILER

CROSS-REFERENCE TO RELATED APPLICATIONS

This application claims the benefit of U.S. Provisional Application No. 61/757,765 filed Jan. 29, 2013, and incorporated herein by reference in its entirety.

FIELD OF THE INVENTION

The present invention relates generally to tanker trailers that are used to haul liquid materials in a tank. More specifically, the present invention pertains to caps for external fixtures on a tanker trailer.

BACKGROUND OF THE INVENTION

A tanker trailer 10 is shown in FIG. 1 and includes a tank 12 having an interior volume at least partially filled with a liquid 14 for transportation. As shown, a manhole cover 18 is provided and coupled to a collar that defines an opening in the top of the tank 12. The manhole cover 18 is pivotally attached to the collar so that an operator may open the cover to access the interior of the tank, typically for cleaning, inspection or repair.

The tank 12 also includes one or more access assemblies 20A, 20B each including a cap 22 coupled to respective collars 24 that define openings to the interior to the tank 12. As shown in FIG. 2, these prior art caps 22 have an internal thread mating with an external thread of the collar 24, so cap 22 is screwed onto the collar 24. When used as caps for an external vent fixture, when the tanker trailer 10 is transported to a desired location where the liquid 14 is to be emptied from the tank 10, the caps 22 must be removed from the collars 24 to allow for ambient air to flow into the tank as liquid is drained from the tank 12. In addition, the caps 22 may he removed so hoses may be attached to the collar 24 to fill the tank with fluid to be transported, or to inject cleaning fluids for cleaning an interior of the tank 12.

Ladders 16 are typically mounted to the trailer 10 and tank 12 at a location that is readily accessible to the manhole cover 18, which is often at a midsection of the tank 12. Accordingly, a catwalk 30 runs along the top of the tank 12, which an operator traverses to access the caps 22. The act of climbing the ladder 16 and traversing the catwalk 30 alone are inherently dangerous, and this inherent danger is compounded when the operator must carry a large wrench tool to remove the caps 22, which may be about three to five inches in diameter. Moreover, in removing the cap 22 the operator is applying torque to the wrench and pivoting on the top of the tank 12 further risking slipping and falling off the tank 12. While systems are available to remotely open and close manhole covers, no such systems exist, nor are adaptable, to open and close the above described caps 22.

BRIEF DESCRIPTION OF THE DRAWINGS

These and other advantages of the invention will become more apparent from the following description in view of the drawings. Similar structures illustrated in more than one figure are numbered consistently among the drawings.

DETAILED DESCRIPTION OF THE INVENTION

Figure 9:
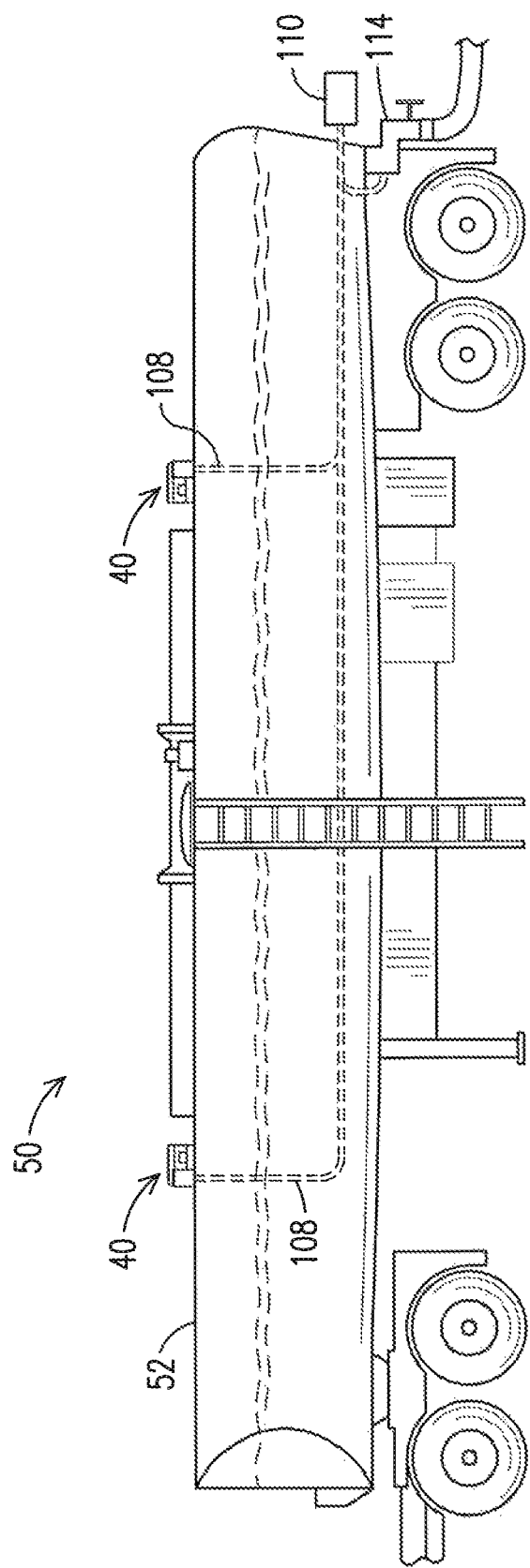
FIG. 9 is a side view of a tanker trailer with cap assemblies of the present invention installed and linked to an existing hydraulic system of the tanker trailer.

The inventors have developed embodiments of the invention for one or more cap assemblies 40 for a tanker trailer 50, as can be seen generally in FIG. 9. The one or more cap assemblies 40 are mounted onto a top of a tank 52 and are remotely operable to open and close without any need for a tanker operator to climb onto a top of the tank 52. By way of example, the cap assemblies 40 may be used to cap a vent, thereby making the cap assemblies 40 vent cap assemblies on, for example, tanker trailers hauling liquid materials. Alternately, or in addition, the cap assemblies 40 may be used to cap a clean-out access port, thereby making the cap assemblies 40 cleanout cap assemblies. These examples are not meant to be limiting and the cap assembly 40 disclosed herein can be used with any opening on the tank 52. An example of such a tanker trailer is the DOT407 tanker trailer; however, the invention is not limited to a specification model or type of tank or trailer. When a fluid must be injected into the tank 52 either for filling and hauling the liquid or for cleaning the cap assemblies 40 are opened. In addition, the cap assemblies 40 may be used for venting when transported fluid is discharged from the tank 52. When the liquid is drained from the tank 52 a valve typically disposed toward a bottom of the tank 52 is opened, and the cap assemblies 40 are also opened so that air within the tank is effectively displaced with ambient air so that the liquid evenly and efficiently flows from the tank 52. The cap assemblies 40 are remotely operable to open and close so an operator or driver may safely drain liquid from or fill the tank 52 without risking walking on top of the tank to open and close the cap assemblies 40.

An embodiment shown in FIGS. 3-8 comprises a collar 42 that is adapted or configured for attachment to an external ventilation or cleanout fixture 44, such as a nipple or a flange, typically disposed on a top of a tank 52 (FIG. 9). The collar 42 defines a collar opening 46 (FIG. 6) that is concentrically aligned with an opening 54 of the external fixture 44 and in fluid communication with an internal volume of the tank 52.

Figure 6:
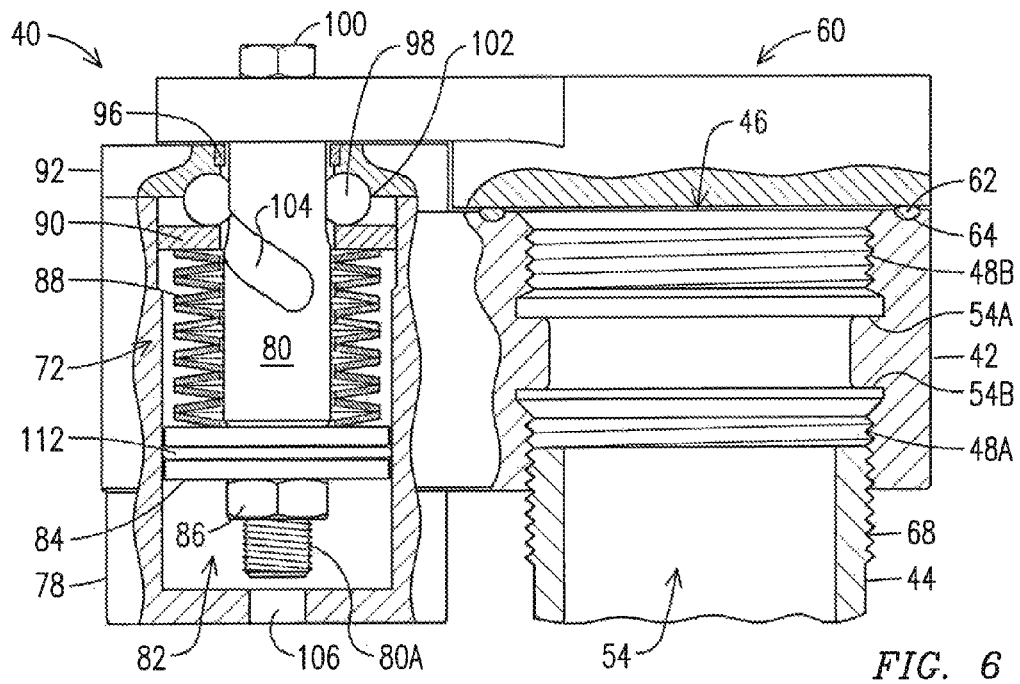
FIG. 6 is a side sectional view of the cap assembly with the lid in a closed position.
Figure 7:
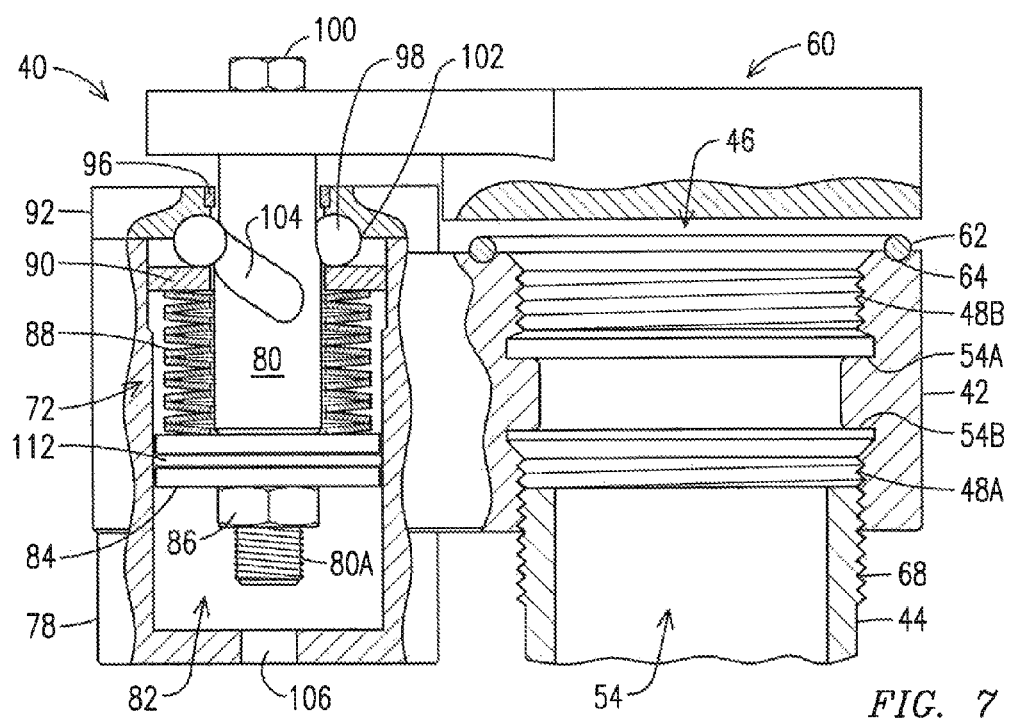
FIG. 7 is a side partial sectional view of the cap assembly with the lid raised for opening the cap assembly.
Figure 8:
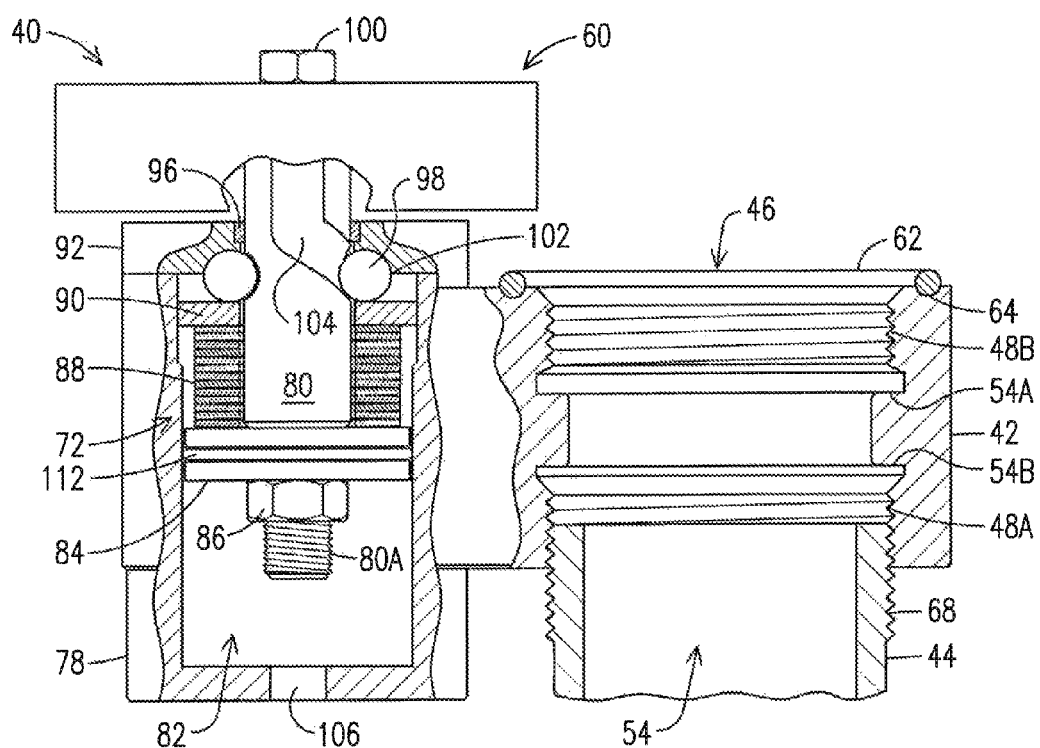
FIG. 8 is a side partial sectional view of the cap assembly with the lid raised and rotated for opening the cap assembly.

As shown in FIGS. 6-8, the collar 42 includes lower internal threads 48A provided in mating relationship with external threads 68 on the external fixture 44 to secure the collar 42 to the external fixture 44. In an embodiment, upper and lower shoulders 54A, 54B are disposed at least partially, circumferentially along an internal surface of the collar 42 between the lower internal threads 48A and upper internal threads 48B. The upper internal threads 48B are provided to receive hose fixtures to secure a hose to the collar 42 to introduce liquid materials for hauling or cleaning an interior of the tank 52. The upper shoulder 54A serves as a stop for a hose and hose fixture attached to the collar 42; and the lower shoulder 54B serves as a stop for abutment against a top of the external fixture 44. In addition, gaskets (not shown) may be seated against flat opposing surfaces of the shoulders 54A, 54B to generally seal the collar opening 46 and control fluid flow into the tank 52 from some outside source.

In other embodiments the collar 42 may not include the lower internal threads 48A or upper internal threads 48B. For example, the external fixture 44 may be a flange so the collar 42 may not require internal threading for attachment and other fastening means, such as an opposing matching flange, may be provided on the collar 42 to bolt the cap assembly 40 to the flange. In addition, upper internal threads 48B may not be required if a wand or hose is inserted and having a diameter (i.e., 2") that is less than the diameter (i.e., 3") of the collar 42. In such cases, operators may not need or want the collar to have internal threads or even the above-described shoulders 54A, 54B.

Figure 1:
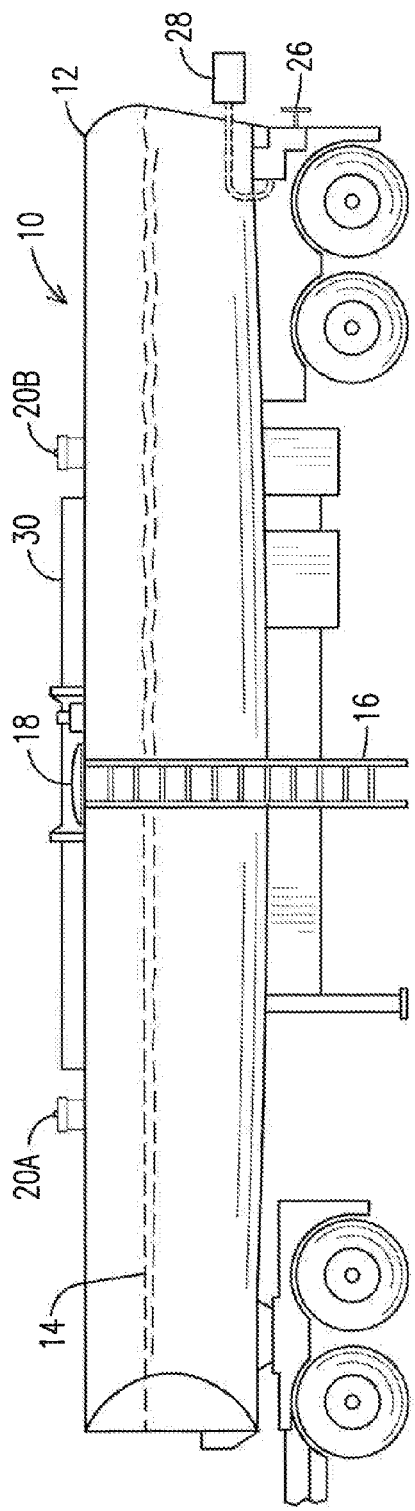
FIG. 1 is a side view of a tanker trailer with prior art cap assemblies.
Figure 2:
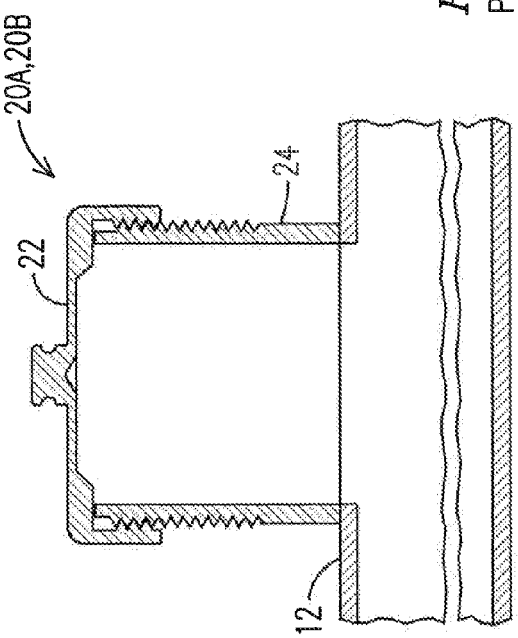
FIG. 2 is a sectional view of a prior art cap assembly.
Figure 3:
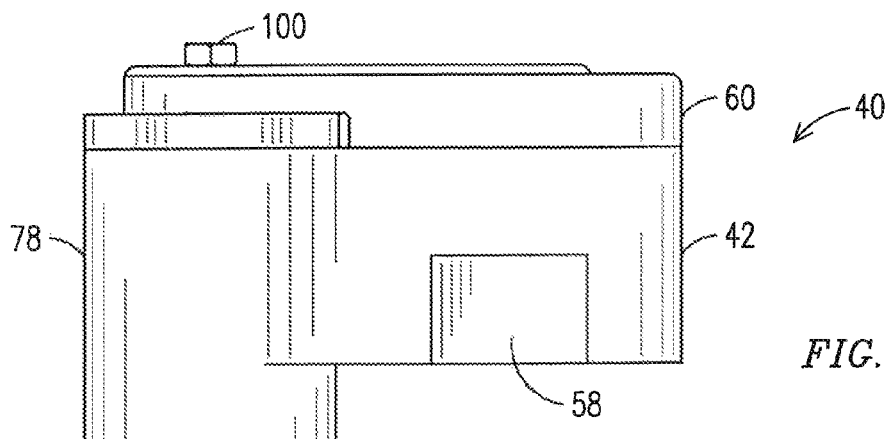
FIG. 3 is a side view of an embodiment of the present invention for remotley operable cap assembly in accordance with the present invention.
Figure 4:
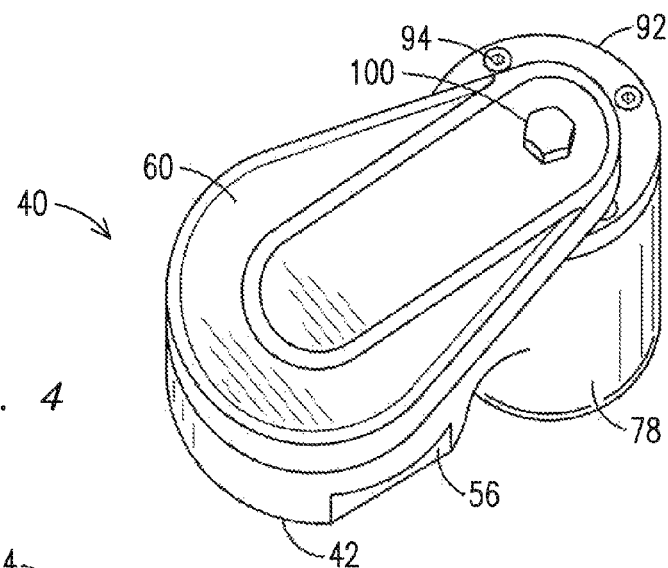
FIG. 4 is a perspective view of the cap assembly.
Figure 5:
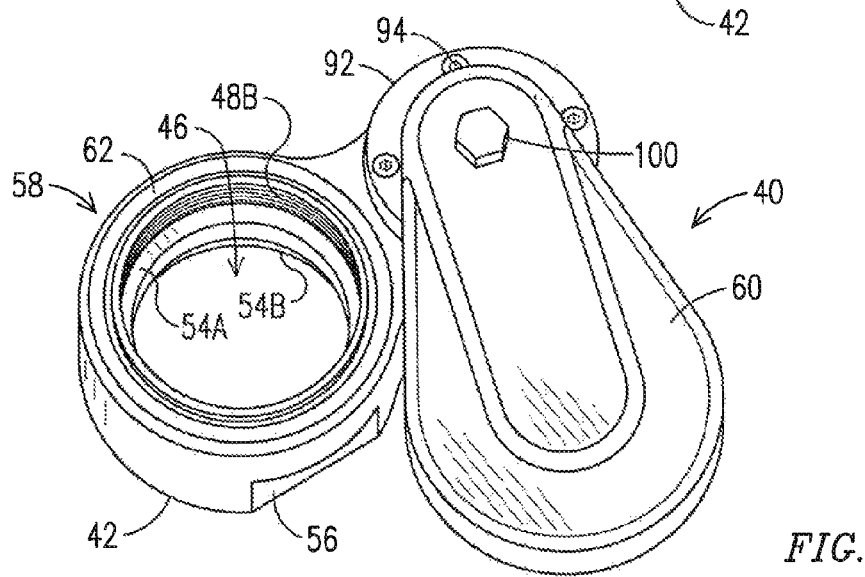
FIG. 5 is perspective view of the cap assembly with a lid in an opened position.

As further shown in FIGS. 3-5, the collar 42 has a generally cylindrical configuration with two diametrically opposed generally flat outer surface sections 56 and 58. The two flat surface sections 56, 58 provide flat gripping surfaces for a wrench or other tool to engage and tighten or remove the collar 42 and cap assembly 40 from the external fixture 44.

As shown in FIGS. 6-8 the cap assembly 40 also includes a lid 60 that is operatively associated with an actuator assembly 72 to move between an open and closed position. In a closed position, sealing element 62 such as an o-ring seal is seated in groove 64 disposed between the lid 60 and collar 42 so that the lid 60 is closed in sealing engagement with the collar 42. In order to open the lid 60 by pivoting the lid laterally about a vertically axis, the lid 60 must be actuated vertically upward, as shown in FIG. 7, before pivoting laterally as seen in FIGS. 5 and 8. Accordingly, the actuator assembly 72 may have a vertical actuating component and a lateral pivoting component. In an alternative embodiment, the lid 60 and actuator assembly 72 are operatively associated so that lid 60 opens by pivoting about a horizontal axis.

In an embodiment, the actuator assembly 72 may be, at least in part, hydraulically and/or pneumatically driven to actuate the lid 60 vertically to initiate opening of the cap assembly 40. As shown in FIGS. 6 and 7, the actuator assembly 72 includes a cylinder 78 including an internal chamber 82 within which the hydraulic actuator assembly components are disposed. A vertically disposed cam rod 80 is attached at a top end thereof to the lid 60 and at a bottom end thereof to a piston 84 that is disposed within the chamber 82. As shown a bolt 100 secures the lid 60 to the cam rod 80, and a retaining nut 86 secures the piston 84 to the bottom end of the cam rod 80A. An o-ring 112 may also be seated on the piston 84 to seal the piston 84 against an internal surface of the chamber 82.

In an embodiment, the chamber 82 may have a diameter of about two inches (2.180") and the piston 84 has a diameter that is slightly smaller (about 0.010" smaller). The cam rod 80 may have an outside diameter of about one inch. Components such as the lid 60, cam rod 80, piston 84, retaining nut 86, body, ball bearing components and the body including the collar 42 and cylinder 78 may be fabricated from a stainless steel such as a 316 stainless steel. The following dimension and materials specifications are provided by way of example and are not intended to be limiting. Optionally, other motive fluids may be used as is known to those in the art. For example, instead of a hydraulic system a pneumatic may be used, or a combination of hydraulic and pneumatic system, etc.

A biasing mechanism 88 is disposed within the chamber 82 between and against the piston 84 and a retaining ring 90 that is spaced above the piston 84 thereby biasing the piston 84, cam rod 80 and lid 60 downward holding the lid in a closed position. An example of a biasing mechanism that may be used with the subject invention is a series of spring washers or a coil spring. However, the subject invention is not intended to be limited to spring washers or a helical/coil spring biasing mechanism, but would encompass any such biasing mechanism that could hold the lid shut or in a closed position. In an embodiment, the biasing mechanism may need to apply a force of about 400-500 lbs. in order to hold the lid 60 closed against 50 psi generated by fluid contents of a trailer. For example, volatile liquids such as gasoline or solvents may create a pressure of up to 35 psi.

Figure 10:
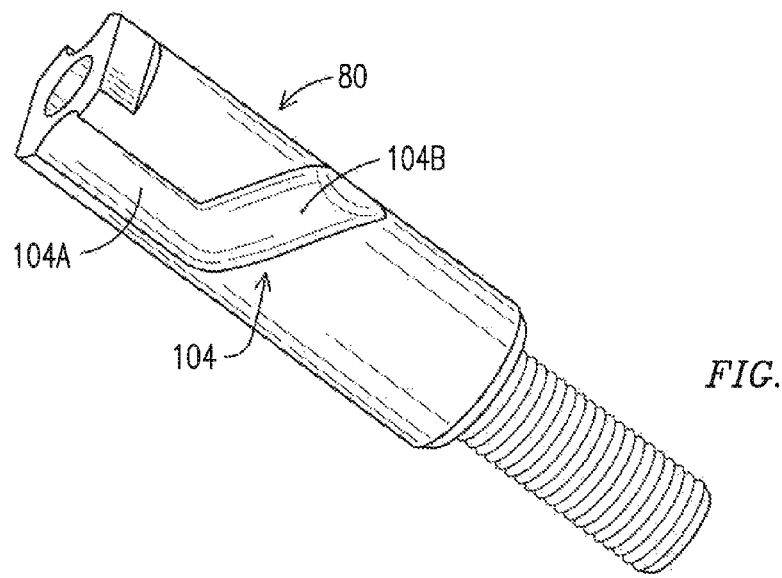
FIG. 10 is a perspective view of a cam rod for use with the cap assembly.

As will be explained the cam rod 80 is operatively connected to a bearing assembly so that the lid 60 pivots laterally to open the cap assembly 40 and external fixture 44 after the cam rod 80 has completed an initial vertical stroke upward to lift the lid 60 off the collar 42. More specifically, and as further illustrated in FIGS. 6-8, a disc 92 is fixed to a top of the cylinder 78 with fasteners 94 (FIGS. 3 and 5). A ball bearing ring 96 is disposed between the disc 92 and the cam rod 80 to facilitate rotation of the cam rod 80. The bearing assembly includes two ball bearings 98 seated between the cam rod 80 and disc 92. The disc 92 includes diametrically opposed indentations 102 and the surface of the cam rod 80 is machined to include diametrically opposed cam grooves 104. As shown in more detail in FIG. 10, the cam grooves 104 include a generally vertical component 104A and a downwardly projecting diagonal component 104B.

In this manner, as the cam rod 80 is driven upward the lid 60 is raised vertically and rotated to open the cap assembly 40 and external fixture 44. As hydraulic fluid is introduced into the chamber 82 under pressure via port 106 the piston 84 is driven upward against the biasing mechanism 88 and cam rod 80, the cam rod 80 is driven vertically upward. Inasmuch as the cam grooves 104 include the vertical component 104A the vertically movement of the cam rod 80 lifts the lid vertically upward as shown in FIG. 7. As the cam rod 80 continues to move upward the respective diagonal components 104B of the cam grooves 104 engage the ball bearings 98 causing the cam rod 80, and consequently the lid 60, to pivot or rotate. When the ball bearings 98 hit or engage a bottom end of the respective cam grooves 104, it is held there by application of hydraulic pressure until such pressure is released. As shown in FIG. 8, the arrangement or configuration of the cam grooves 104 causes the lid to pivot clockwise; however, the cam grooves 104 may be configured so that cam rod 80 and lid 60 pivot or rotate in a counter-clockwise opposite direction. In an embodiment, the entire vertical stroke of the cam rod 80 may be less than an inch (i.e., 0.670"), which may include about a 0.145" along the vertical component 104A to lift the lid 60 and clear the sealing element 62 and about 0.525" of the vertical stroke is along the diagonal component 104B as the lid pivots or rotates.

When the hydraulic pressure is released, the biasing mechanism 88 forces the piston 84 and cam rod downward in the chamber 82. The interaction of the ball bearings 98 and cam grooves 104 causes the cam rod 80 and lid pivot in an opposite direction to that of opening the cap assembly 40. When the ball bearings 98 reach the vertical component 104A of the respective cam grooves 104, the cam rod 80 and lid 60 are further lowered to close the cap assembly 40 and external fixture 44.

In an embodiment of the subject invention, the cap assembly 40 may be operatively connected to an actuating system to drive the piston vertically up and down to move the lid 60 to open and close the cap assembly 40 and the external fixture 44. For example, the cap assembly 40 may be linked to an existing hydraulic system provided with the tanker trailer 50. Alternately, the cap assembly 40 may be linked to a discrete hydraulic system dedicated to the movement of the lid 60 of the cap assembly 40. As shown in FIG. 9, the cap assembly 40 and cylinder 78 are provided in fluid communication with a hydraulic pumping system 110. Hydraulic systems for tanker trailers may be readily retrofitted to connect the cap assembly 40 to the existing hydraulic system by providing a hydraulic distributor/manifold with fittings for one or more hydraulic lines 108 to provide fluid communication between a hydraulic pumping system 110 and respective cap assemblies 40 and between the hydraulic pumping system 110 and a discharge valve 114. In this configuration the hydraulic pumping system 110 could include a single hydraulic pump set up to operate both the cap assembly 40 and the discharge valve 114. Other fittings and lines may also be provided for operation of other trailer components as well. An example of a manual hydraulic pump that may be used with a DOT407 tanker trailer hydraulic system may have a rated pressure of 3,000 p.s.i., with a displacement of 0.43 in$^3$ and a total fluid capacity of 18 oz, and useable capacity of 14 oz. Alternately, the hydraulic pumping system 110 may include a first hydraulic pump configured to operate the other hydraulics on the tank 52 such as the discharge valve 114, and a second hydraulic pump and separate plumbing dedicated to operating the cap assembly 40. In this latter arrangement the cap assembly 40 has its own hydraulic system discrete from the hydraulic system that operates the discharge valve 114, and hence the cap assembly 40 can be operated separate from the operation of any other hydraulics on the tank 52 such as the discharge valve 114.

In accordance with the present invention, the cap assembly 40 may be remotely operable from the hydraulic pumping system 110 to open and close from a location off of the tank 52. This will allow an operator to control the cap assembly 40 without the operator having to climb onto the tank 52 to manually open or close the assembly. An example of such remote control includes appropriate valves/controls disposed proximate the hydraulic pumping system 110 that are operable by an operator standing on the ground adjacent the hydraulic pumping system 110.

The cap assemblies 40 can be used when it is necessary to introduce fluid that is used to clean an interior of the tank or fluid that is necessary for hauling. In addition, the cap assemblies 40 may be used to provide ventilation to the interior of the tank when liquid is discharged from the tank after transportation. In an embodiment, the cap assemblies 40 may be linked to the hydraulic pumping system 110 such that as hydraulic fluid is supplied to the cap assemblies 40 and to the discharge valve 106, the assemblies are configured to open at a predetermined hydraulic pressure that is less than a hydraulic pressure necessary to open the discharge valve. In this manner, the cap assemblies 40 are remotely operable to open before the discharge valve 106 to ventilate the tank and account for air volume displacement as a result of the discharge of liquid from the tank 52.

Figure 11:
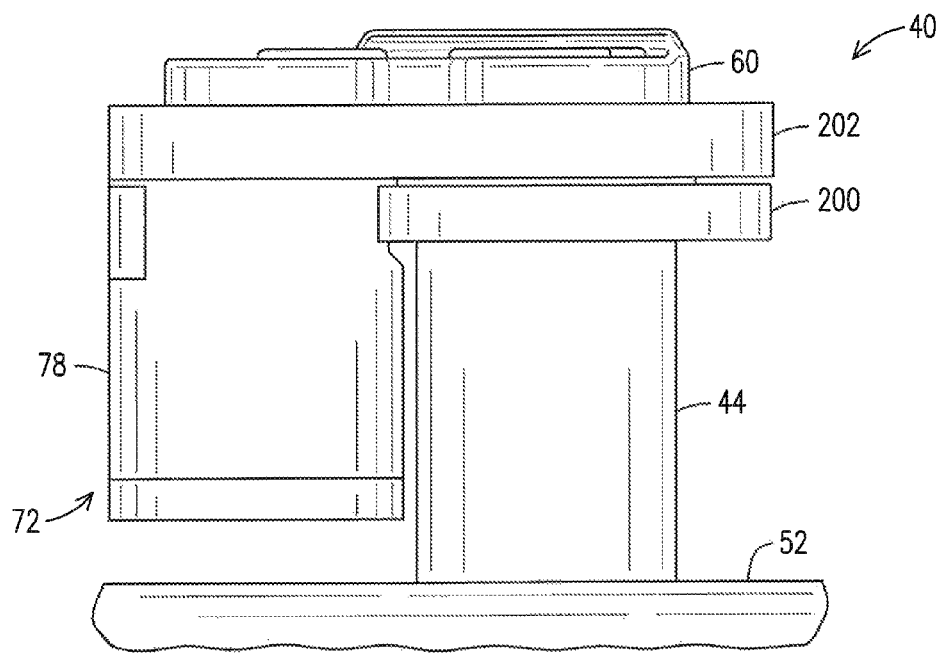
FIG. 11 is a side view of an alternate embodiment of the cap assembly.

FIG. 11 shows a side view of an alternate embodiment of the cap assembly 40 having a weld flange 200 secured to the external fixture 44 extending from the tank 52. The weld flange 200 can be secured via any means known to those of ordinary skill in the art, including via interlocking threads, bolts, and welding. If a weld is used existing threads on the external fixture 44 may first be removed. A collar 202 is secured to the weld flange 200 via any means known to those of ordinary skill in the art, including via interlocking threads, bolts, and welding, and this may create an airtight seal therebetween. The actuator assembly 72 is secured to the collar 202 and the lid 60 is operatively connected to the actuator assembly 72 and lid 60. As shown the lid 60 is secured to the collar 202 and is in the closed position.

Figure 12:
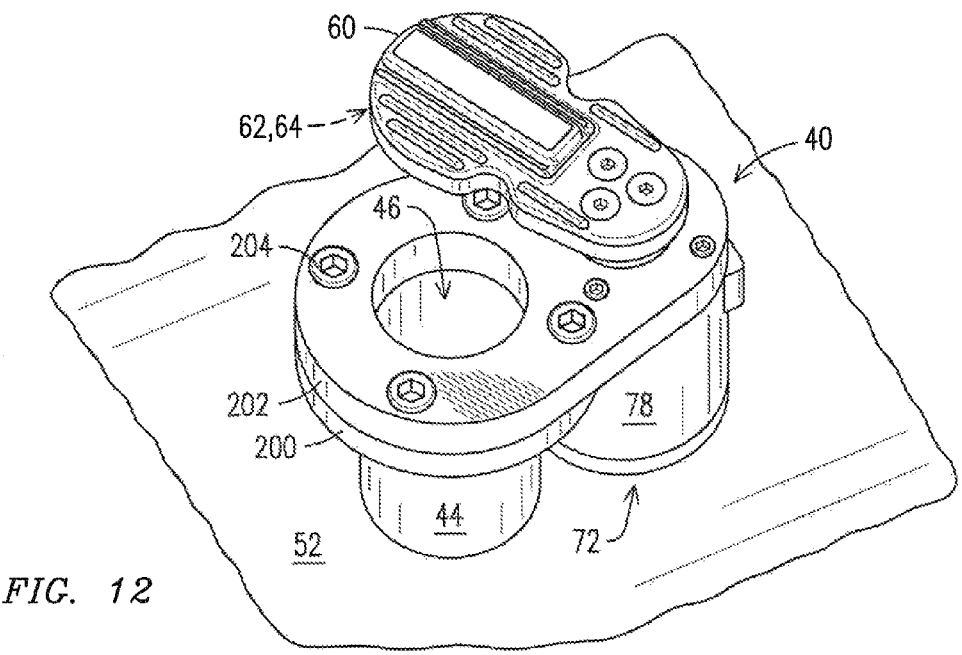
FIG. 12 is a perspective view of the alternate embodiment of the cap assembly with the lid in the open position.

FIG. 12 is a perspective view of the alternate embodiment of the cap assembly 40 with the lid 60 in the open position. In this embodiment the collar 202 is secured to the weld flange 200 via weld flange bolts 204. Though not visible in this view, the groove 64 in this exemplary embodiment is disposed on the underside of the lid 60, and the sealing element 62 rests in the groove 64, whereas in the exemplary embodiment of FIGS. 6-8 the groove 64 is disposed not in the lid 60, but instead in the collar 42. This arrangement permits fluid communication between the atmosphere and the internal volume of the tank 52 through the collar 202.

Figure 13:
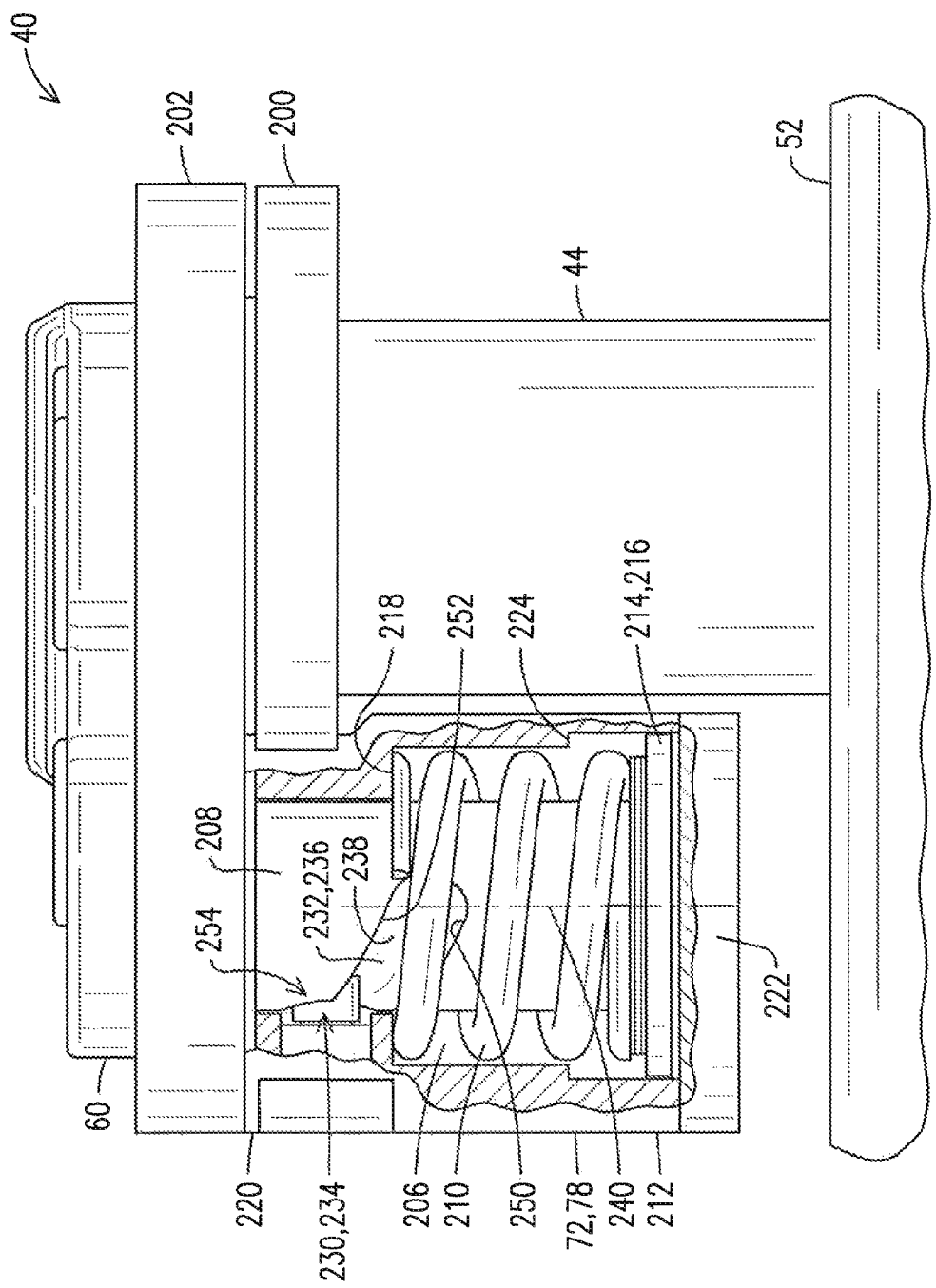
FIG. 13 is a partial cross sectional side view of the cap assembly with the lid in the closed position.

FIG. 13 is a partial cross sectional side view of the cap assembly 40 with the lid 60 in the closed position and where the cylinder 78 is shown in cross section. Disposed within an internal chamber 206 of the cylinder 78 is a piston 208 shown in a first position associated with the closed position of the lid 60. A biasing mechanism 210 such as a coil spring biases the piston 208 toward a bottom end 212 of the cylinder 78. The biasing mechanism 210 is disposed between a piston flange 214 at a bottom end 216 of the piston 208 and a spring-seat 218 disposed above a bottom end 212 of the cylinder and below a top end 220 of the cylinder. As shown the biasing mechanism 210 is compressed, and therefore is exerting a downward force on the piston 208. As a result, the lid 60 is exerting a downward force on the sealing element 62 to enhance the effectiveness of the seal. This sort of biasing may be necessary to overcome pressure that forms within the internal volume of the tank during normal storage and transportation activities. Instead of a coil spring, a series of spring washers may be stacked to form the biasing mechanism 210, or other arrangements may be used as are known to those of ordinary skill in the art. A bottom cap 222 is secured to the bottom end 212 of the cylinder and may form a positive stop at a closed end of the piston's stroke. A cylinder ridge 224 is formed on an inner wall 226 of the cylinder and is configured to interact with the piston flange 214 to create a positive stop at an open end of the piston's stroke.

A cam follower 230 is secured to the cylinder 78 and cooperates with a cam feature 232 to cause the lid 60 to rotate laterally away from the collar opening 46 as the piston moves vertically from the first position during its stroke. In the embodiment shown the cam follower 230 is a stud-type cam follower with an outer race 234 configured to interact with a cam groove 236. A diagonal portion 238 of the cam groove 236 is oriented diagonally with respect to the piston 208 such that it is elongated around the circumference as well as along a longitudinal axis 240 of the piston 208. As the piston 208 moves vertically from the first position the outer race 234 encounters a lower wall 250 of the cam groove diagonal portion 238. The interaction of the outer race 234 and the lower wall 250 of the cam groove diagonal portion 238 during the vertically upward motion causes the piston 208 to rotate clockwise when viewed from above. This rotation pivots the lid 60 laterally away from the collar opening 46. The reverse happens when the piston 208 travels vertically downward from the second position at the uppermost end of its stroke. During this vertically downward movement the outer race 234 encounters an upper wall 252 of the cam groove diagonal portion 238 and the interaction causes the piston 208 to rotate counter clockwise when viewed from above. The counter clockwise rotation pivots the lid 60 from the open position to a position centered over the collar opening 46.

When close to the first (closed) position the piston 208 does not rotate, but instead, when within a predetermined distance of the first position the piston 208, moves only vertically. The predetermined distance is large enough to permit the lid 60 to pivot laterally away from or laterally over the opening without any contact between the sealing element 62 and the collar 202 during the pivoting motion. The predetermined distance may be large enough to account for any spring-back (vertical expansion) of the sealing element 62 that may result when compressive force is removed from the o-ring 42 as the lid 60 lifts. To accommodate the vertical-only movement the piston 208 may be configured to have no cam feature 232 that would operatively interact with the cam follower 230 when the piston 208 moves though the predetermined distance from the first position. Alternately, such as when the cam groove 236 is used, the cam groove 236 may have a vertical portion 254 that is oriented only along the longitudinal axis 240 of the piston 208. Stated another way, the vertical portion 254 would be oriented vertically in the view of FIG. 13.

Figure 14:
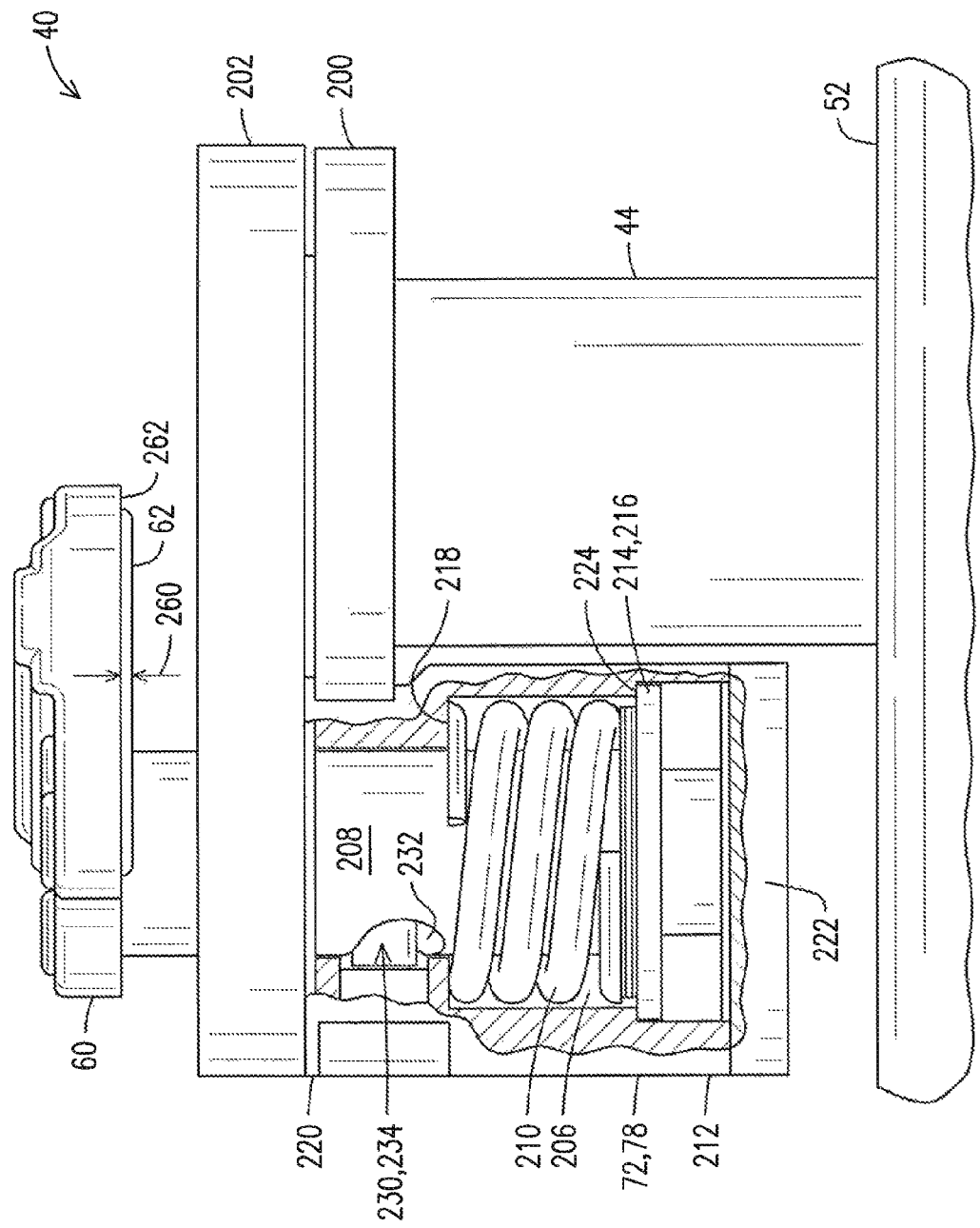
FIG. 14 is a partial cross sectional side view of the cap assembly with the lid in the open position.

FIG. 14 is a partial cross sectional side view of the cap assembly 40 with the lid 60 in the open position and where the cylinder 78 is shown in cross section. The piston 208 is shown disposed in the second position associated with the open position of the lid 60. The cam follower 230 has caused the lid 60 to pivot laterally away (out of the page) from the collar opening 46 in order to allow fluid communication between the internal volume of the tank 52 and the atmosphere. The lid 60 initially lifted vertically the predetermined distance that is equal to or greater than a distance 260 the o-ring 62 extends from a sealing face 262 of the lid 60, allowing it to pivot freely.

Figure 15:
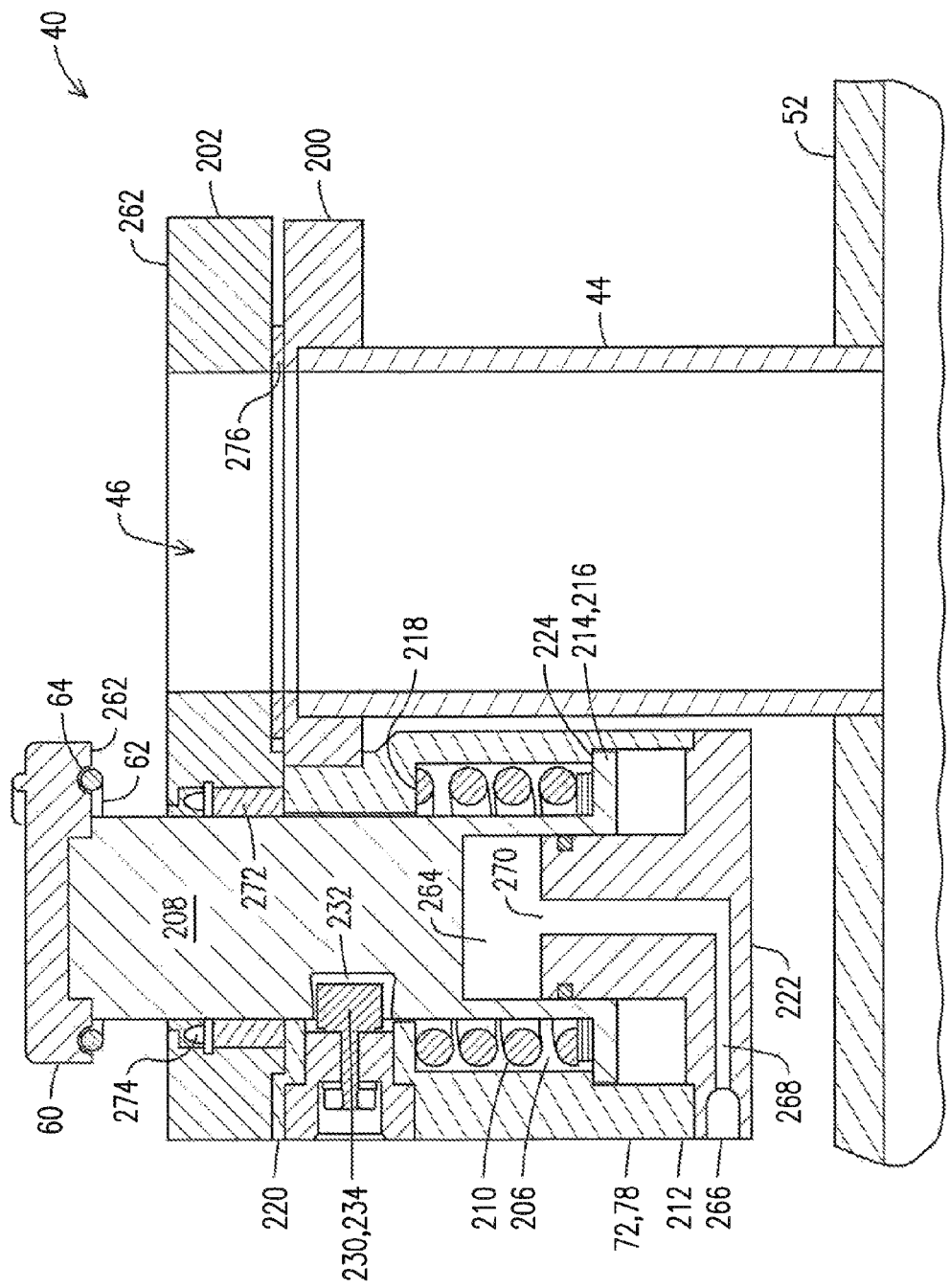
FIG. 15 is a side cross sectional view of the cap assembly.

FIG. 15 is a side cross sectional view of the cap assembly 40 with the lid 60 in the open position and the piston 208 is shown disposed in the second position. The bias of the biasing mechanism 210 may be overcome in any way known to those of ordinary skill in the art, including hydraulic actuation, pneumatic actuation, a combination of hydraulic and pneumatic actuation, and even mechanical actuation such as lifting the piston 208 by rotating a screw drive etc. In the embodiment shown the actuator assembly 72 is configured to receive hydraulic fluid under pressure in an end cavity 264 disposed in the piston 208 at the bottom end 216 of the piston 208. The hydraulic fluid may enter the bottom cap 222 an a bottom cap inlet 266 and travel through an end cap passageway 268 and exit the bottom cap 222 via an end cap outlet 270 where the hydraulic fluid then fills the end cavity 264. As the pressurized hydraulic fluid continues to fill the end cavity 264 the vertical force on the piston 208 from the pressurized hydraulic fluid overcomes the downward force on the piston 208. This causes the piston 208 to rise vertically from the first position where the lid 60 is in the closed position until the piston flange 214 reaches the cylinder ridge 224 which stops the piston 208 at the second position where the lid 60 is in the open position. The configuration of the end cavity 264 permits a relatively little amount of motive fluid such as hydraulic fluid to be used. This, in turn, reduces the amount of pumping action the hydraulic pumping system 110 needs to generate. The result is a faster action of the piston 208. In an exemplary embodiment the bias of the biasing mechanism 210 is such that the motive fluid begins to move the piston 208 when at a pressure of about 100 psi while pressures in the range of about 300-500 psi will enable the motive fluid to completely overcome the bias and move the lid 60 to the open position.

Figure 16:
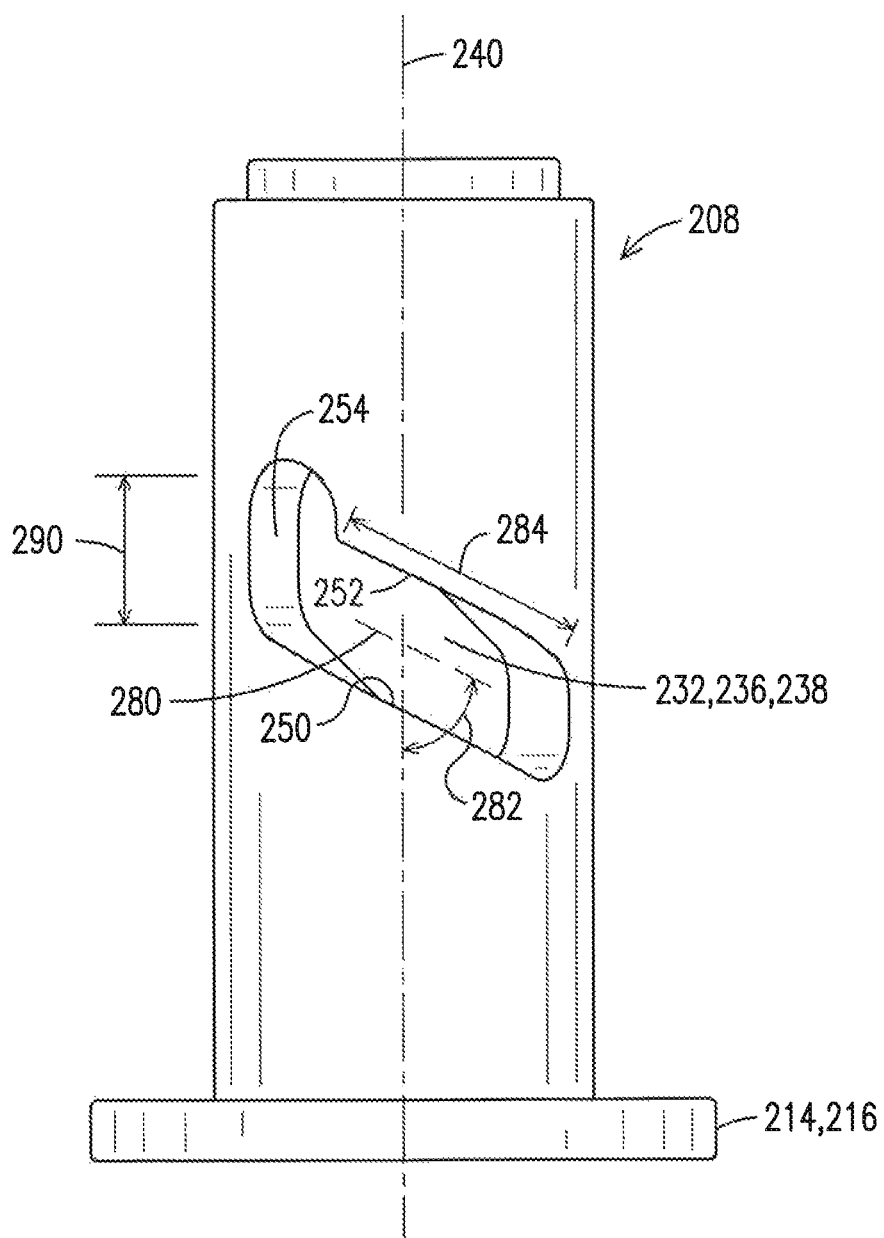
FIG. 16 is a side view of the piston with an unobstructed view of the cam feature.

FIG. 16 is a side view of the piston 208 with an unobstructed view of the cam groove 236. A diagonal axis 280 of the diagonal portion 238 may take any suitable angle 282 with the longitudinal axis 240 of the piston 208. A length 284 of the diagonal portion 238 may also be selected as desired. The diagonal portion 238 may have a single angle 282 and associated length 284 or multiple angles and associated lengths. Likewise, a length 290 of the vertical portion 254 may be selected as desired.

As used herein, moving from the first position to the second position occurs in a single upward stroke of the piston 208, and hence the lid 60 moves from the closed position to the open position in a single opening stroke of the piston 208. Likewise, moving from the second position to the first position occurs in a single downward stroke of the piston 208, and hence the lid 60 moves from the open position to the closed position in a single closing stroke of the piston 208. A cycle of the piston 208 includes one opening stroke and one closing stroke and would be effective to move the lid 60 from one position to the other and back again.

The actuator assembly 72 may further include a sleeve bearing 272 disposed at the top end 220 of the cylinder 78 and configured to reduce friction the piston 208 experiences during a stroke. This smoothes the piston's travel and reduces wear. There may also be a wiper 274 configured to prevent contaminants from entering the internal chamber 206 of the cylinder 78 during operation, and a gasket 276 disposed between the weld flange 200 and the collar 202 to improve the seal formed there between.

While the preferred embodiments of the present invention have been shown and described herein, it will be obvious that such embodiments are provided by way of example only. Numerous variations, changes and substitutions will occur to those of skill in the art without departing from the invention herein. Non-limiting examples include a component that is described above as being attached to one part of the apparatus may alternatively be attached to a different part of the apparatus in other embodiments. Parts described as being indirectly connected may be connected directly to each other, and vice versa. Component parts may be assembled from individual pieces or may be integrally formed as a single unit. Alternative types of connectors and alternative materials may be used. The apparatus may be used with other types of power tools. Accordingly, it is intended that the invention be limited only by the spirit and scope of the appended claims.

What is claimed is:

1. A cap assembly for attachment to an external fixture on a tank of a tanker trailer, comprising:
   a collar configured to secure the cap assembly to the tank external fixture and defining a collar opening concentrically aligned with an opening of the fixture;
   a lid that is moveable between a closed position where the lid covers the collar opening and is in sealing engagement with the collar, and an open position where the lid is vertically raised from the collar and pivoted laterally away from the collar opening; and
   an actuator assembly comprising a biasing mechanism effective to bias the lid into the closed position, the actuator assembly configured to move the lid from the closed position to the open position during a single stroke of the actuator assembly, wherein during an opening stroke the actuator assembly is configured to initially vertically raise the lid from the closed position and then laterally pivot the lid away from the collar opening, wherein the pivot occurs about a vertical axis, wherein the actuator assembly is remotely operable via a remote control from a location off of the tanker trailer.

2. The cap assembly of claim 1, further comprising a sealing element disposed between the collar and the lid, and wherein the vertical rise is sufficient to permit the lateral pivot without interference between the lid and the sealing element.

3. The cap assembly of claim 1, wherein the actuator assembly is configured to receive hydraulic fluid under pressure and effective to overcome the bias and move the lid into the open position.

4. The cap assembly of claim 3, wherein the actuator assembly comprises a cylinder in which the piston and the biasing mechanism are disposed, and wherein the biasing mechanism comprises a spring disposed between a bottom end of the piston and a spring-seat inside the cylinder and above the bottom end of the piston, and wherein the spring biases the piston toward a bottom end of the cylinder.

5. The cap assembly of claim 4, wherein the piston comprises a cavity at the bottom end of the piston, and wherein the actuator assembly is configured to receive the hydraulic fluid in the cavity.

6. The cap assembly of claim 1, wherein the actuator assembly further comprises a cam follower, wherein the piston comprises a cam feature configured to operatively interact with the cam follower during the single stroke, and wherein the operative interaction effects the lateral pivoting of the lid.

7. The cap assembly of claim 6, wherein the actuator assembly further comprises a cylinder in which the piston resides, and wherein the cam follower comprises a stud cam follower mounted on the cylinder.

8. The cap assembly of claim 6, wherein the cam feature comprises a cam groove disposed on an exterior of the piston.

9. The cap assembly of claim 8, wherein the cam groove comprises a diagonal portion oriented both circumferentially and axially and configured to effect the lateral pivoting.

10. The cap assembly of claim 1, wherein the actuator assembly is configured to receive pressurized hydraulic fluid to effect the single stroke.

11. A tanker trailer for transporting liquid materials, comprising:
 a tank comprising an external fixture;
 a hydraulic system operatively associated with the tank; and
 a cap assembly, comprising:
  a collar configured to secure the cap assembly to the tank external fixture and defining a collar opening aligned with an opening of the external fixture;
  a lid that is moveable between a closed position where the lid covers the collar opening and is in sealing engagement with the collar and an open position where the lid is vertically raised and pivoted laterally away from the collar opening; and
  an actuator assembly comprising a biasing mechanism and a piston the biasing mechanism and the piston disposed in a cylinder, wherein movement of the piston effects movement of the lid from the closed position to the open position, wherein during an opening stroke the actuator assembly is configured to initially vertically raise the lid from the closed position and then laterally pivot the lid away from the collar opening, wherein the pivot occurs about a vertical axis, wherein the biasing -mechanism biases the piston toward a bottom of the cylinder and when so biased the lid is biased in the closed position,
 wherein the hydraulic system is configured to permit operation of the actuator assembly from a location off of the tank via a remote control.

12. The tanker trailer of claim 11, the actuator assembly further comprising a cam follower secured to the cylinder and configured to operatively interact with a cam groove disposed diagonally on an exterior of the piston to effect the lateral pivot of the lid.

13. The tanker trailer of claim 11, wherein the biasing mechanism is disposed between a bottom end of the piston and a spring-seat inside the cylinder and above the bottom end of the piston.

14. The tanker trailer of claim 13, wherein the piston comprises a cavity at the bottom end of the piston configured to receive hydraulic fluid under pressure to overcome the bias and effect the movement of the piston.

15. The tanker trailer of claim 11, further comprising a discharge valve configured to discharge the liquid materials, and a hydraulic system configured to operate the discharge valve and the actuator assembly, wherein the cap assembly is configured to open at a predetermined hydraulic pressure that is less than a hydraulic pressure necessary to open the discharge valve.

16. The tanker trailer of claim 11, wherein the hydraulic system is dedicated to operating the cap assembly.

17. A cap assembly for attachment to an external fixture on a tank of a tanker trailer, comprising:
 a collar configured to secure the cap assembly to the tank external fixture and defining a collar opening concentrically aligned with an opening of the fixture;
 a lid that is moveable between a closed position where the lid covers the collar opening and is in sealing engagement with the collar and an open position where the lid is vertically raised and pivoted laterally away from the collar opening; and
 an actuator assembly comprising a biasing mechanism and a piston, the biasing mechanism and the piston disposed in a cylinder, wherein movement of the piston effects movement of the lid from the closed position to the open position during a single stroke of the piston, wherein the piston is biased toward a bottom of the cylinder and when so biased the lid is biased in the closed position, wherein during an opening stroke the actuator assembly is configured to initially vertically raise the lid from the closed position and then laterally pivot the lid away from the collar opening, wherein the pivot occurs about a vertical axis; and
 wherein the actuator assembly is configured to be remotely operable via a remote control from a location off of the tanker trailer.

18. The cap assembly of claim 17, further comprising a hydraulic system configured to effect the single stroke of the piston.

19. The cap assembly of claim 17, wherein the actuator assembly further comprises a cam follower secured to the cylinder, wherein the piston comprises a cam groove configured to operatively interact with the cam follower during the single stroke, and wherein the operative interaction effects the lateral pivoting of the lid.

20. A cap assembly for attachment to an external fixture on a tank of a tanker trailer, comprising:
 a collar configured to secure the cap assembly to the tank external fixture and defining a collar opening concentrically aligned with an opening of the fixture;

a lid that is moveable between a closed position where the lid covers the collar opening and is in sealing engagement with the collar, and an open position where the lid is vertically raised from the collar and pivoted laterally away from the collar opening; and an actuator assembly that is configured to move the lid from the closed position to the open position during a single stroke of the actuator assembly and which is remotely operable via a remote control, the actuator assembly comprising a piston and a cam follower, wherein the piston comprises a cam groove disposed on an exterior of the piston and configured to operatively interact with the cam follower during the single stroke, and wherein the operative interaction effects the lateral pivoting of the lid.

21. The cap assembly of claim 20, wherein the cam groove comprises a diagonal portion oriented both circumferentially and axially and configured to effect the lateral pivoting.

22. A tanker trailer for transporting liquid materials, comprising:

a tank comprising an external fixture;

a hydraulic system operatively associated with the tank; and a cap assembly, comprising:

a collar configured to secure the cap assembly to the tank external fixture and defining a collar opening aligned with an opening of the external fixture;

a lid that is moveable between a closed position where the lid covers the collar opening and is in sealing engagement with the collar and an open position where the lid is vertically raised and pivoted laterally away from the collar opening; and an actuator assembly comprising a piston disposed in a cylinder, wherein movement of the piston effects movement of the lid from the closed position to the open position, wherein the piston is biased toward a bottom of the cylinder and when so biased the lid is biased in the closed position, the actuator assembly further comprising a cam follower secured to the cylinder and configured to operatively interact with a cam groove disposed diagonally on an exterior of the piston to effect the lateral pivot of the lid, wherein the hydraulic system is configured to permit operation of the actuator assembly from a location off of the tank.

23. The cap assembly of claim 1, wherein the lid is secured to the actuator assembly, wherein the actuator assembly is secured to the collar, and wherein the collar rests atop the tank external feature.

* * * * *